United States Patent [19]

Berry et al.

[11] 4,210,810

[45] Jul. 1, 1980

[54] RADIATION SCANNING SYSTEM

[75] Inventors: Peter J. Berry; Herbert M. Runciman, both of Glasgow, Scotland

[73] Assignee: Barr & Stroud Limited, Glasgow, Scotland

[21] Appl. No.: 938,517

[22] Filed: Aug. 31, 1978

[30] Foreign Application Priority Data

Sep. 13, 1977 [GB] United Kingdom ............... 38087/77

[51] Int. Cl.² ............................................... G01J 1/00
[52] U.S. Cl. .................................................. 250/347
[58] Field of Search ............... 250/334, 342, 347, 351; 350/6.7, 6.8, 6.9

[56] References Cited

U.S. PATENT DOCUMENTS

| | | | |
|---|---|---|---|
| 3,597,617 | 8/1971 | Passaro | 250/334 |
| 3,875,330 | 4/1975 | Daglgvist et al. | 250/334 |
| 3,941,923 | 3/1976 | Wheeler | 250/334 |
| 4,084,092 | 4/1978 | Runciman | 250/347 |

Primary Examiner—Davis L. Willis
Assistant Examiner—Janice A. Howell
Attorney, Agent, or Firm—Mason, Fenwick & Lawrence

[57] ABSTRACT

A radiation scanning system comprises a detector, a transfer lens forming a real image of the detector, a rotary scanning means interposed between the transfer lens and the detector image in such a way that as the rotary scanning means is rotated the detector image moves in a circular locus, a concave substantially-spherical mirror concentrically disposed with respect to the detector locus, said locus being at the focal surface of the mirror so that for different rotational positions of the rotary scanning means differently directed parallel bundles of rays emanate from the mirror all intersecting at a pupil, and a second scanning means located at said pupil. The two scanning means provide orthogonal line and frame scans.

5 Claims, 9 Drawing Figures

RADIATION SCANNING SYSTEM

This invention relates to radiation scanning systems and is of particular importance when a high scanning speed combined with constant scanning speed is required. The scanner belongs to the class of systems in which a scene is scanned by two mechanisms, one operating at high speed to give a scan line, and the other operating at a lower speed to give frame scan.

In order to achieve TV compatible line rates with a mechanical scanning system, the scan speeds required are such that mechanical movements other than simple rotation are not feasible and the moving optical parts must be small and robust. The simple, solid multi-facetted rotor best answers these requirements, but even then it is necessary that the rotor should be as small as possible to conserve power. It is also important in many such scanning systems that the speed at which the image of the detector is scanned across the scene should be constant, particularly in "serial" scanning systems in which successive elements of a detector array are scanned over the same part of the scene, the resulting signals being delayed by appropriate amounts and summed to improve the signal to noise ratio. Moreover, if TV compatibility is required it is desirable that the scan locus at the scene should be substantially rectilinear, as otherwise the displayed picture would show distortion.

If a scanner having separate line and frame scan mechanisms is to be used with an afocal telescope to give the desired field of view, both line and frame scans should have a common pupil which should coincide substantially with the exit pupil of the telescope. Since it is not feasible to make the scan mechanisms coincident, some form of pupil imaging system must be inserted between the two scan mechanisms.

The present invention satisfies all the above requirements in a relatively simple manner.

According to the present invention there is provided a radiation scanning system comprising a radiation detector, a transfer lens disposed to form a real image of said detector, a first scanning means comprising a rotor having a plurality of reflective planar facets disposed uniformly around its circumference, each facet having its normal substantially perpendicular to the axis of rotation of the rotor, said rotor being interposed between the transfer lens and the image of the detector formed by the transfer lens and having its axis of rotation intersecting the optical axis of the transfer lens and disposed in such a way that as the rotor is rotated the aforesaid image is caused to move in a substantially circular locus, a concave substantially-spherical mirror located substantially concentrically with the aforesaid detector locus and having the locus substantially at the focal surface of the concave mirror so that following reflection from the aforesaid concave mirror the rays from the detector for any given rotational position of the rotor are collimated to a parallel bundle, and a second scanning means for deflecting the aforesaid parallel bundle of rays in a direction substantially perpendicular to the direction of deflection due to the first scanning means, said second scanning means being located substantially at the pupil formed by the intersection of the different bundles of parallel rays from the detector for different rotational positions of the first scanning means.

Preferably, the axis of rotation of the rotor is disposed at such an angle to the principal ray between the transfer lens and the rotor as to permit free passage of radiation through the system. Conveniently, the axis of the first scanning means is substantially perpendicular to the principal ray between the transfer lens and the rotor in the vicinity of the rotor, and a plane mirror is located between the transfer lens and the rotor substantially at the aforesaid locus, said plane mirror having an elongated aperture in it so placed as to allow free passage of radiation between the rotor and the concave mirror.

The second scanning means may comprise a plane mirror which is caused to oscillate about an axis or a second rotor having a plurality of planar facets substantially parallel to its axis of rotation.

The pupil of the transfer lens may form the limiting stop of the system or the limiting stop of the system may be formed by the successive facets of the rotor comprising the first scanning means.

The concave mirror may be spherical or aspheric, and an optical corrector of the Bouwers concentric type may be placed either in the beam between the concave mirror and the second scanning means or in the beam between the concave mirror and the first scanning means.

A body of uniform or known temperature may be placed substantially at the locus of the image of the detector formed by the transfer lens and first scanning means in such a way that radiation from this body is received by the detector during part of the interval between successive scans by the first scanning means.

The rotor comprising the first scanning means may be driven by a gas-bearing motor and be enclosed in a chamber having a window of material such as to allow free passage of radiation to and from the rotor.

Plane mirrors may be inserted at one or more points in the beam to render the overall configuration of the system more compact.

Embodiments of the present invention will now be described by way of example with reference to the accompanying drawings, in which.

Figure 1:
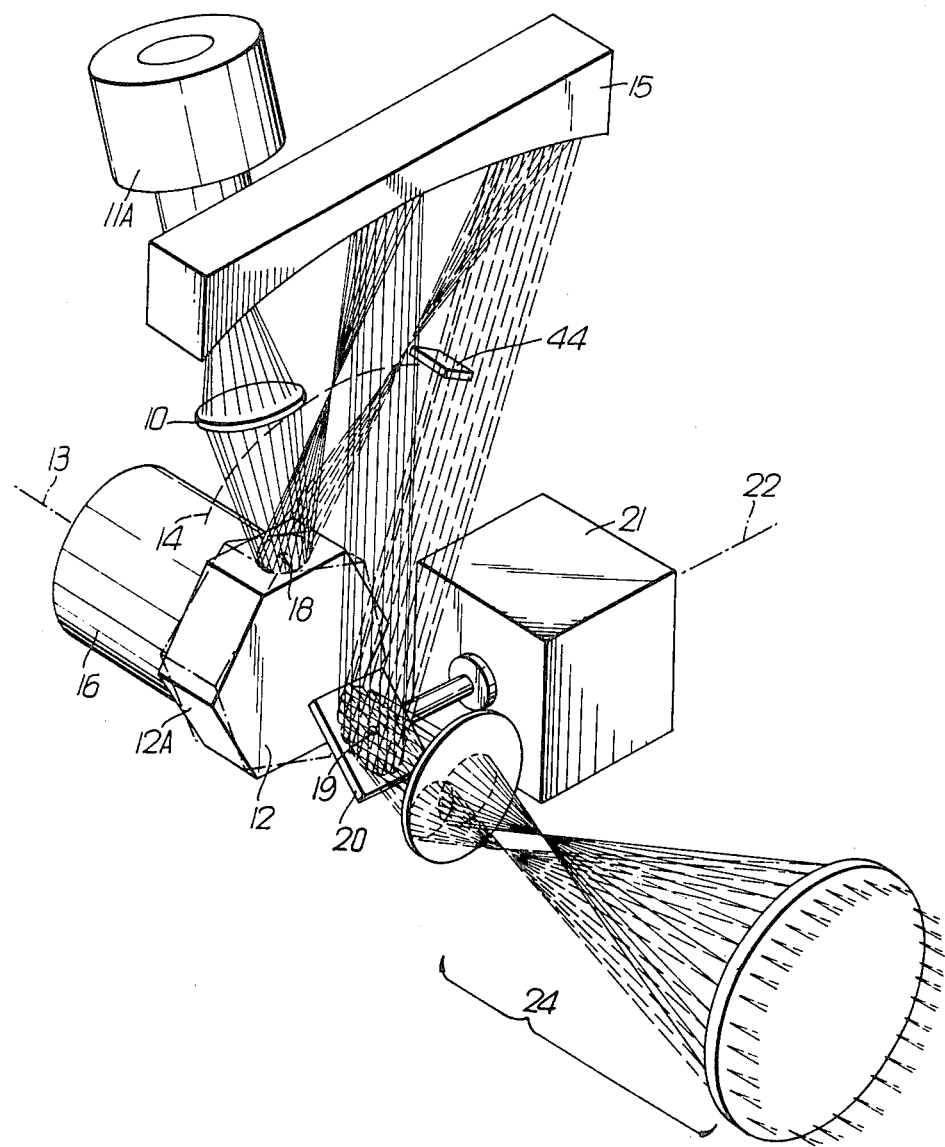
FIG. 1 is a diagrammatic view of a first embodiment.

The operation of the system is best understood if the detector is regarded as a source of radiation which is projected on the scene by the scanning system.

In the drawings a transfer lens 10 is used to form a real image of a detector 11 located within a housing 11A. A multifacetted rotor 12 is placed between the lens 10 and the detector image, such that when the rotor turns about its axis 13 the image traces out a locus 14 which is approximately circular. The rotor facets are denoted 12A and are reflective. The locus 14 is placed at the focus of a spherical mirror 15 (since the mirror is spherical the focal surface is also substantially spherical if the stop is near the centre of curvature). Since the image of the detector lies at all times at the focal surface of the mirror 15, the mirror 15 renders all rays passing through a given point of the image locus 14 into a parallel bundle, the angle between which and the system axis changes as the rotor turns (since the detector image moves along the locus). When the rotor 12 is turned by means of a drive member 16 the principal ray forming the detector image pivots substantially about a point 18, this point defining a "line scan pupil". A real image of this point 18 is formed at point 19 by the concave mirror 15 so that as the rotor turns the principal ray always passes through this second point 19 which thus determines the position of a pupil conjugate to the line scan pupil. At this point 19 (the "frame scan pupil") is placed a mirror 20 which is caused to oscillate by a drive member 21 about an axis 22 normal to the axis 13 of the rotor, so that a frame scanning action is added to the line scan action due to the rotor 12. (The frame scan action could be performed by a second rotor, by counter-rotating prisms, or by any other known means, but the oscillating mirror is the most convenient technique in practical terms). An afocal telescope 23 is used to give the desired field of view, and is placed with its exit pupil in the plane of the secondary scan pupil 19 since this position results in the minimum diameter of optical components in the telescope.

In order to avoid obscuration which is undesirable in a high performance system, the principal ray from the detector in FIG. 1 is not perpendicular to the rotation axis 13 but is inclined at a small angle, and since all faces of the rotor are parallel to the rotation axis 13, the image locus 14 lies in a plane approximately normal to the rotor axis, and after reflection by the mirror 15 the principal ray for all scan positions also lies on a plane approximately normal to the axis 13. For this reason the scanned lines referred to the scene are straight despite the off-axis nature of the system.

Figure 2:
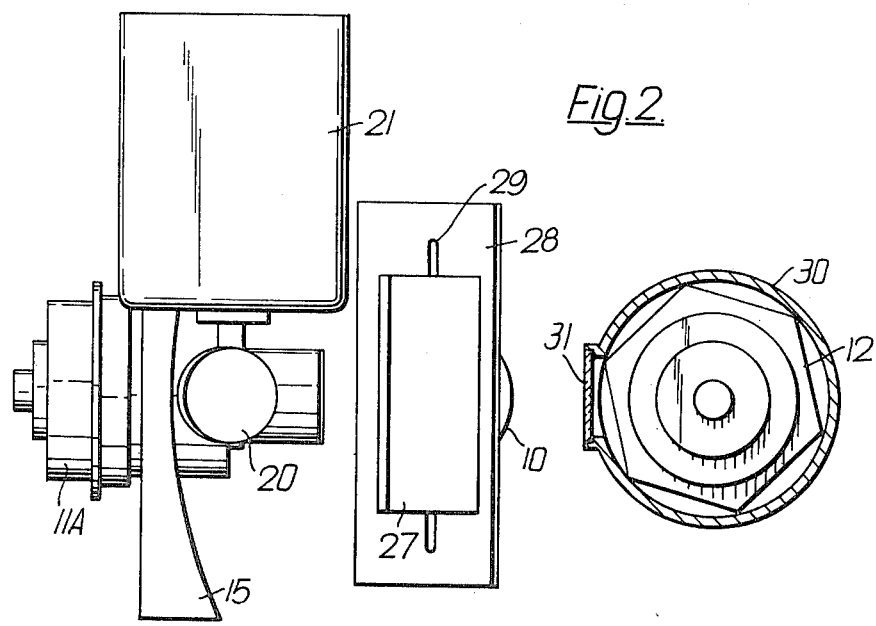
FIGS. 2 and 3 are side and elevational views of a second embodiment.
Figure 3:
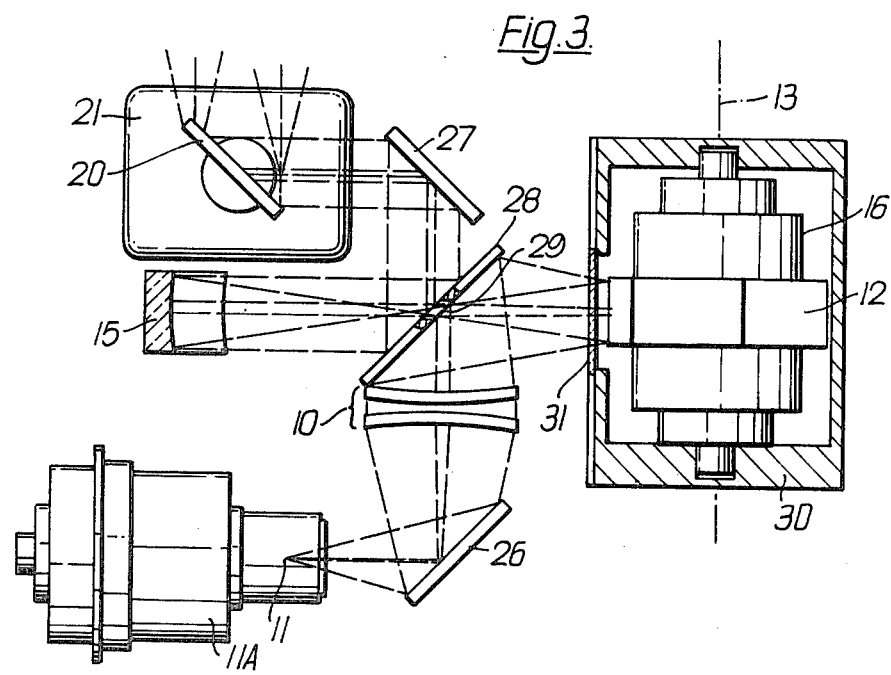

In the embodiment shown in FIGS. 2 and 3 the principal ray in the region of the rotor 12 is perpendicular to the rotor axis 13 and this is achieved by the use of plane mirrors 26, 27 to effect folding of the optical beam. Additionally, however, a plane mirror 28 is located between the transfer lens 10 and the rotor 12 in such a way that the transfer lens 10 and the detector 11 do not intercept the desired radiation impinging on the rotor 12, the mirror 28 having an elongate slit 29 aligned with the scan locus 14 to permit free passage of radiation between the rotor 12 and the concave mirror 15. In this embodiment the rotor 12 is driven by a gas-bearing motor which is enclosed in a housing 30 having a window 31 made of a material which permits free passage of radiation to and from the rotor. This system incorporates a degree of obscuration but this can be tolerated in situations where a high degree of compactness is of concern.

Figure 4:
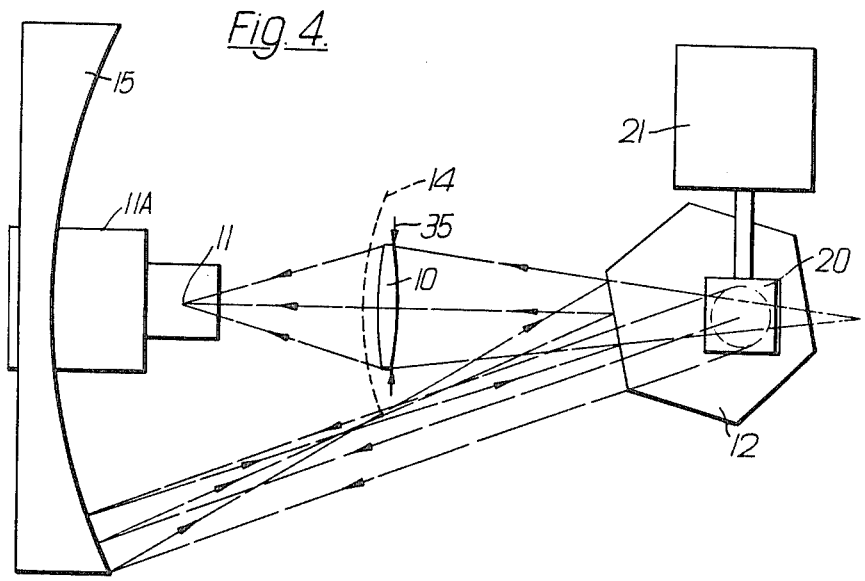
FIGS. 4 and 5 show modifications to the relative sizes of components in the first embodiment.

The positions of the line scan pupil 18 and of its conjugate image 19 depend on which of two design criteria are adopted, each of which has its advantages and disadvantages. In one criterion which is illustrated in FIG. 4 the limiting stop 35 of the system is formed by the transfer lens 10. When this is done the only scanned radiation received by the detector 11 emanates from the scene which guarantees freedom from undesirable shading effects. The only disadvantage is that, since the rays forming the detector image can be represented as a stationary cone, the rotor 12 must be sufficiently large for no vignetting to take place during the scan period as the rotor facet moves past the fixed beam. In this case the line scan pupil 18 lies substantially at the surface of the rotor 12 and since the surface of the rotor does not coincide with the centre of curvature of the scan locus 14 (which is also the centre of curvature of the mirror 15) it is found that the image at pupil 19 of the line scan pupil 18 is considerably magnified, and that the angle through which the parallel beam is scanned by the rotor is reduced compared to the angle through which the principal ray is scanned in the vicinity of the rotor. Both these effects are desirable in general, since the first results in a smaller rotor size for a given size of telescope exit pupil, and the second results in a smaller beam angle being presented to the telescope for a given rotation angle of the rotor, making the telescope design easier.

Figure 5:
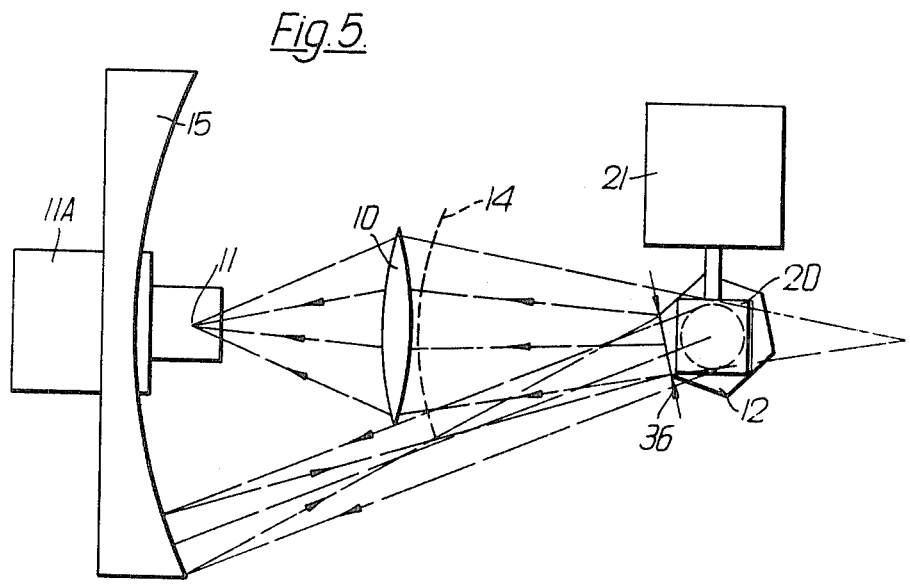

The second criterion which is illustrated in FIG. 5 is to make the rotor face the limiting stop 36 of the system. In this case, the transfer lens 10 must be considerably increased in diameter so that the cone of rays forming the detector image is sufficiently large to allow the moving rotor facet to be entirely within it during the scan period. The radiation from the scene received by the detector 11 forms a smaller cone which is selected from the large cone by the moving rotor facet, so that the angle of incidence of the radiation from the scene impinging on the detector 11 varies with time, and the detector also receives radiation from other parts of the scanner. The principal advantages of this technique are that the rotor 12 may be made much smaller and the scan efficiently much higher. The line scan pupil 18 in this case is found to lie a distance behind the rotor facet equal approximately to half its radius.

It can be shown that the line scan rate for a constant rotor speed in either the FIG. 4 or FIG. 5 arrangement is substantially constant, and is independent of the position in the frame scan.

Figure 6:
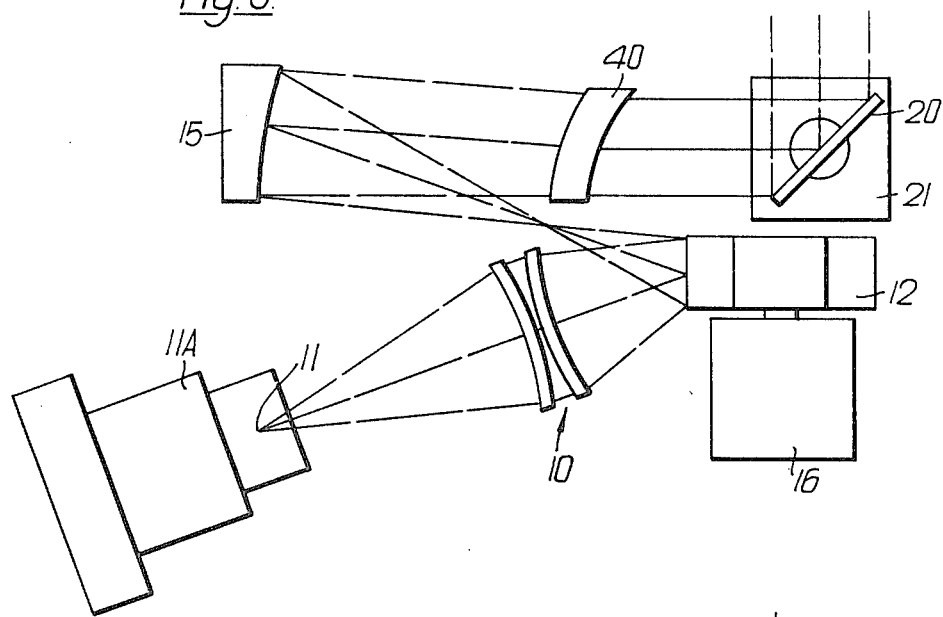
FIGS. 6 and 7 show the effect of optical corrector components in the system.
Figure 7:
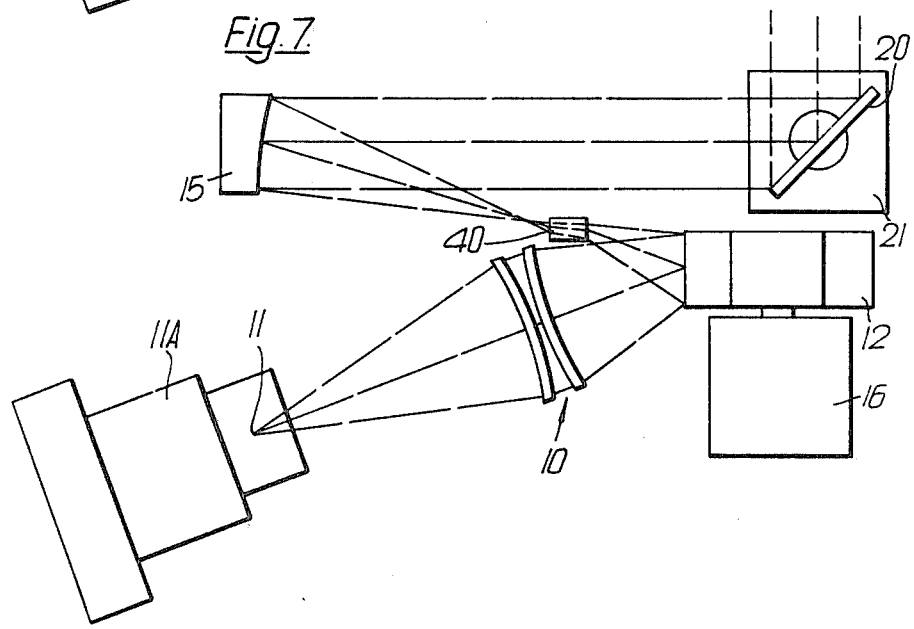

The compactness of the system which can be achieved is limited primarily by the aberrations of the concave mirror since a reduction in f-number below about f/3.5 results in unacceptable image degradation. This can be overcome by optical correction, one practical method being the use of a Bouwers concentric corrector 40 placed either in the parallel beam between the mirror 15 and the frame scan pupil 19 as shown in FIG. 6 or in the converging beam in the vicinity of the image locus as shown in FIG. 7. Alternatively, an improvement can also be achieved by aspherising of the mirror 15.

Figure 8:
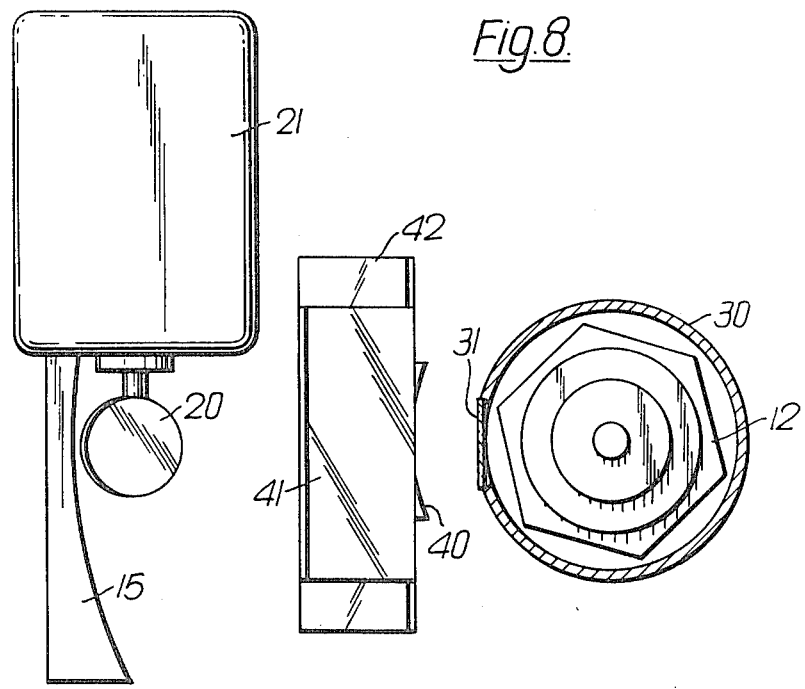
FIGS. 8 and 9 are side and elevational views of a third embodiment.
Figure 9:
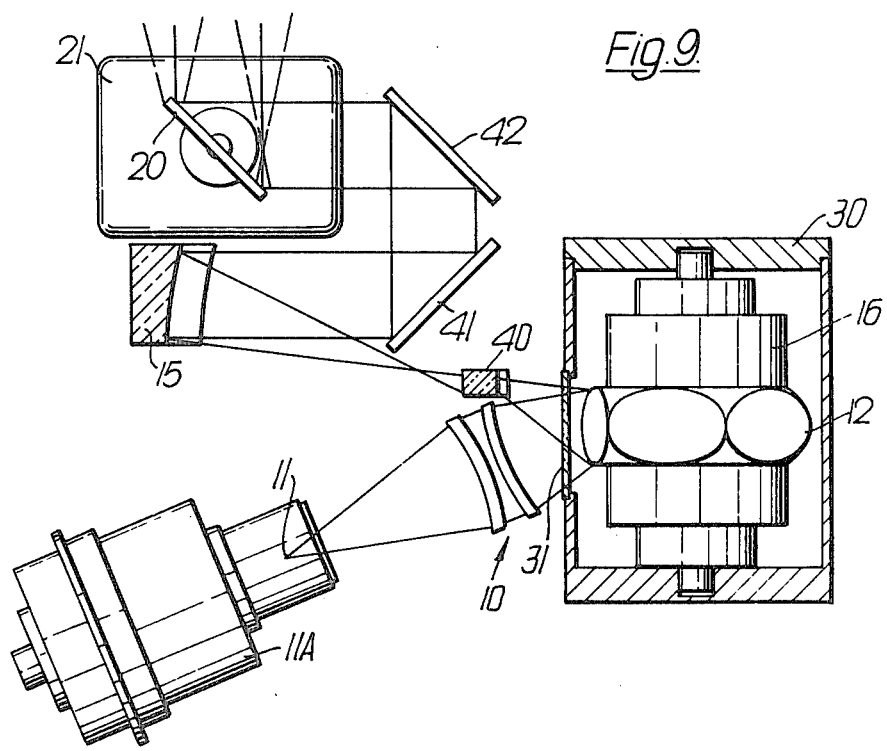

In the embodiment shown in FIGS. 8 and 9 the system is rendered more compact by the use of fold mirrors 41, 42 in a similar manner to the mirrors 27, 28 of FIGS. 2 and 3.

In radiation scanning systems particularly for use in the thermal IR region it is frequently desirable that the detector should periodically be caused to receive radiation from a body of uniform or known emission. Such a body may be conveniently placed at the scan locus 14 of the detector image in such a position that it is scanned before or after the scene and is shown diagrammatically at 44 in FIG. 1.

The detector may be a single detecting element or an array of such elements such as is used in known infrared scanners.

What is claimed is:

1. A radiation scanning system comprising a radiation detector, a transfer lens disposed to form a real image of said detector, a first scanning means comprising a rotor having a plurality of reflective planar facets disposed uniformly around its circumference, each facet having its normal substantially perpendicular to the axis of rotation of the rotor, said rotor being interposed between the transfer lens and the image of the detector formed by the transfer lens and having its axis of rotation intersecting the optical axis of the transfer lens and disposed in such a way that as the rotor is rotated the aforesaid image is caused to move in a substantially circular locus, a concave substantially-spherical mirror located substantially concentrically with the aforesaid detector locus and having the locus substantially at the focal surface of the concave mirror so that following reflection from the aforesaid concave mirror the rays from the detector for any given rotational position of the rotor are collimated to a parallel bundle, and a second scanning means for deflecting the aforesaid parallel bundle of rays in a direction substantially perpendicular to the direction of deflection due to the first scanning means, said second scanning means being located substantially at the pupil formed by the intersection of the different bundles of parallel rays from the detector for different rotational positions of the first scanning means.

2. A system as claimed in claim 1, wherein said second scanning means comprises a plane mirror which is caused to oscillate about an axis.

3. A system as claimed in claim 1, wherein said second scanning means comprises a second rotor arranged for rotation about an axis and having a plurality of planar facets substantially parallel thereto.

4. A system as claimed in any preceding claim, wherein said concave mirror is aspheric and an optical corrector of the Bouwers type is located in the optical path between the concave mirror and one of said scanning means.

5. A system as claimed in claim 1, wherein a plane mirror is located between the transfer lens and the rotor so that the axis of the first scanning means is substantially perpendicular to the principal ray between the transfer lens and the rotor in the vicinity of the rotor, said plane mirror being located substantially at the detector image locus and having an elongated aperture to allow free passage of radiation between the rotor and the concave mirror.

* * * * *